United States Patent
Heeb (10) Patent No.: US 11,788,900 B2
(45) Date of Patent: Oct. 17, 2023

(54) METHOD FOR DETERMINING THE TEMPERATURE OF A POWER ELECTRONICS UNIT, DEVICE, AND POWER ELECTRONICS UNIT

(71) Applicant: Robert Bosch GmbH, Stuttgart (DE)

(72) Inventor: Michael Heeb, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 17/599,525

(22) PCT Filed: Mar. 18, 2020

(86) PCT No.: PCT/EP2020/057371
§ 371 (c)(1),
(2) Date: Sep. 28, 2021

(87) PCT Pub. No.: WO2020/200779
PCT Pub. Date: Oct. 8, 2020

(65) Prior Publication Data
US 2022/0146326 A1 May 12, 2022

(30) Foreign Application Priority Data
Mar. 29, 2019 (DE) ...................... 10 2019 204 425.5

(51) Int. Cl.
*G01K 7/01* (2006.01)

(52) U.S. Cl.
CPC ........... *G01K 7/01* (2013.01); *G01K 2217/00* (2013.01)

(58) Field of Classification Search
CPC .............................. G01K 7/01; G01K 2217/00
(Continued)

(56) References Cited

FOREIGN PATENT DOCUMENTS

| CN | 109565271 A | * | 4/2019 | ............. G01K 3/005 |
| DE | 102013219373 A1 | | 3/2015 | |

(Continued)

OTHER PUBLICATIONS

Luo et al., "Online High-Power P-i-N Diode Chip Temperature Extraction and Prediction Method with Maximum Recovery Current di/dt", IEEE Transactions on Power Electronics, Institute of Electrical and Electronics Engineers, vol. 30, No. 5, 2015, pp. 2395-2404.

(Continued)

*Primary Examiner* — Mirellys Jagan
(74) *Attorney, Agent, or Firm* — Michael Best & Friedrich LLP (57) ABSTRACT

The invention relates to a method for determining the temperature of a power electronics unit (1) which has at least one commutator circuit (2) and a load (3) which is powered/can be powered by the commutator circuit (2). The commutator circuit (2) comprises a first semiconductor switch device (4), which has a first semiconductor switch (5) and optionally a first diode (6), and a second diode (9), wherein the second diode (9) and the load (3) are connected in parallel to the first semiconductor switch (5). The curve of an electric current flowing through the second diode (9) is monitored at least when a reverse current is produced in the second diode (9) after the semiconductor switch (5) has been switched so as to become conductive. On the basis of the current curve, the temperature of a barrier layer of the second diode (9) is determined. A difference between a current value of a circuit current flowing through the commutator circuit (2) and an extremal current value {Imax} produced by the reverse current is ascertained on the basis of the current curve, and the temperature of the barrier layer of the second diode (9) is determined on the basis of the difference.

14 Claims, 4 Drawing Sheets

(58) Field of Classification Search
USPC .......................................................... 374/178
See application file for complete search history.

(56) References Cited

FOREIGN PATENT DOCUMENTS

| DE | 102019204423 A1 | * | 10/2020 | ............... G01K 7/01 |
| JP | 2007047177 A | * | 2/2007 | ............... G01K 7/00 |
| WO | WO-2007037323 A1 | * | 4/2007 | ............... G01K 7/01 |
| WO | 2016124296 A1 | | 8/2016 | |

OTHER PUBLICATIONS

Luo et al., "Online High-Power P-i-N Diode Junction Temperature Extraction with Reverse Recovery Fall Storage Charge", IEEE Transactions on Power Electronics, 2017, pp. 2558-2567.
Translation of International Search Report for Application No. PCT/EP2020/057371 dated Jun. 22, 2020 (2 pages).

* cited by examiner

METHOD FOR DETERMINING THE TEMPERATURE OF A POWER ELECTRONICS UNIT, DEVICE, AND POWER ELECTRONICS UNIT

BACKGROUND OF THE INVENTION

The invention relates to a method for determining a temperature of a power electronics unit, which has at least one commutation circuit and a load that is/can be powered by the commutation circuit, wherein the commutation circuit comprises a first semiconductor switch device, which has a first semiconductor switch and optionally a first diode, and a second diode, wherein the second diode and the load are connected to the first semiconductor switch in parallel with one another, wherein, after the first semiconductor switch has been switched to be conducting, a current profile of an electrical current flowing through the second diode is monitored at least while a reverse current is produced in the second diode, and wherein a temperature of a barrier layer of the second diode is determined in dependence on the current profile.

In addition, the invention relates to an apparatus for performing the method mentioned in the introduction.

The invention furthermore relates to a power electronics unit having such an apparatus.

Power semiconductors, for example power semiconductor switches or diodes, of a power electronics unit are subject to enormous stresses during the operation of the power electronics unit. In order to protect the power semiconductors against a thermal overload, a temperature of the power semiconductors or of the power electronics unit is frequently determined and the power electronics unit is operated in dependence on the determined temperature.

In order to determine the temperature, it is known to integrate NTC temperature sensors in the power electronics unit. It is additionally known to ascertain a temperature-dependent electrical semiconductor property of a power semiconductor of the power electronics unit and to determine the temperature of the power semiconductor in dependence on the ascertained temperature-dependent electrical semiconductor property. For example, the forward voltage of a power semiconductor is such a temperature-dependent electrical semiconductor property.

The publication "Online High-Power p-i-n Diode Junction Temperature Extraction With Reverse Recovery Fall Storage Charge," IEEE Trans. on Power Electronics, pp. 2558-2567, April 2017 (Luo et al.) discloses a method for determining a temperature of a power electronics unit of the type mentioned in the introductory part. The power electronics unit in this case comprises a commutation circuit and a load that is/can be powered by the commutation circuit. The commutation circuit has a first semiconductor switch device, which comprises a first semiconductor switch and a first diode, and a second diode. The second diode and the load are connected here to the first semiconductor switch in parallel with one another. The presence of the first diode is optional for the formation of the commutation circuit. The first semiconductor switch and the second diode form a commutation circuit in as far as an electrical current flowing in the forward direction through the second diode commutates onto the first semiconductor switch after the first semiconductor switch has been switched to be conducting. That means that the current flowing through the second diode decreases and at the same time an electrical current flowing through the first semiconductor switch increases, with a load current flowing through the load remaining constant. According to Luo et al., after the first semiconductor switch has been switched to be conducting, a current profile of the current flowing through the second diode is monitored while a reverse current is produced in the second diode. A reverse current is here understood to mean an electrical current that flows counter to the forward direction of a diode, for example the second diode, through the diode. The reverse current is produced in that, after a current flowing in the forward direction of the diode, remaining charge carriers are present in a space charge zone of the diode, and in that said charge carriers are removed from the space charge zone. According to Luo et al., for monitoring the current profile, an electrical voltage of a parasitic inductance of the commutation circuit that corresponds to the current profile is measured during the occurrence of the reverse current, wherein then the temperature of the barrier layer of the second diode is determined in dependence on an amplitude of a voltage profile of the voltage of the parasitic inductance.

SUMMARY OF THE INVENTION

The method according to the invention has the advantage that the temperature of the barrier layer of the second diode is reliably ascertained. To this end, provision is made according to the invention for a difference between, for one part, a current value of a circuit current flowing through the commutation circuit and, for the other, an extreme current value produced by the reverse current to be ascertained in dependence on the current profile and for the temperature of the barrier layer of the second diode to be determined in dependence on the difference. The extreme current value produced by the reverse current is here understood to mean a maximum or a minimum of the current profile while the reverse current flows through the second diode. Generally, the extreme current value appears as a minimum because the reverse current is an electrical current flowing counter to the forward direction of the second diode. Depending on the procedure used, it is also possible for the extreme current value to appear as a maximum during the ascertainment of the extreme current value or of the current profile, however. It is assumed that the extreme current value of the reverse current or the difference correlates to the temperature of the barrier layer of the second diode, with the result that the temperature of the barrier layer of the second diode is ascertainable in dependence on the extreme current value or the difference. The extreme current value of the reverse current or the difference is thus a temperature-dependent electrical semiconductor property. The current value of the circuit current is understood to be a current value of an electrical current that flows through at least one element of the commutation circuit. The current value of the circuit current is preferably ascertained in dependence on the current profile. To this end, the current profile before or after the occurrence of the reverse current produced in the second diode is preferably taken into account.

According to a preferred embodiment, provision is made for the temperature of the barrier layer of the second diode to be ascertained in dependence on a correction value that corresponds to a current value of a load current flowing through the load. It is assumed that, before the first semiconductor switch is switched to be conducting, an electrical current flows through the second diode, the current value of which corresponds to the current value of the load current flowing through the load. It is furthermore assumed that the current value of the electrical current flowing through the second diode before the first semiconductor switch is switched to be conducting, or the current value of the load current, influences the extreme current value of the reverse current. Since the current value of the load current flowing through the load is taken into account in the form of the correction value, the accuracy during the determination of the temperature of the barrier layer of the second diode is thus increased.

The current flowing through the second diode is preferably measured for the purpose of monitoring the current profile. This results in the advantage that the current profile is directly available. As a consequence, the evaluation or the determination of the temperature of the barrier layer of the second diode is simplified. The current profile through the second diode is preferably measured directly and in a potential-free manner. The current profile is measured for example by means of a Hall sensor, Rogowski sensor, or the like. Alternatively or additionally, the current profile is measured preferably directly and in a potential-bound manner. To this end, an electrical voltage that is present at an electrical resistor, or a voltage profile of said voltage, is measured and the current profile is calculated by means of Ohm's law in dependence on the voltage profile. Since, for ascertaining the current profile, the voltage profile needs to be multiplied only by a correction factor that correlates to a resistance value of the electrical resistor, it is also assumed in this case that the current profile is measured directly.

According to a preferred embodiment, provision is made for a voltage profile of a parasitic inductance to be captured and for the current profile to be ascertained in dependence on the captured voltage profile. This results in the advantage that the method is technically easy to perform. It is assumed that the voltage profile corresponds to an increase in the current profile. Consequently, the current profile is ascertainable by integration of the voltage profile of the parasitic inductance. To this end, the following equation (1.1) is preferably used, wherein $\Delta V_{SS}$ corresponds to a voltage value of the parasitic inductance, $L_{par}$ corresponds to an inductance of the parasitic inductance, and $I_D$ corresponds to a current value of the current profile.

$$\Delta V_{SS} = -L_{par} \times \frac{dI_D}{dt} \qquad (1.1)$$

In this case, the extreme current value generally appears as a maximum.

The current profile is preferably monitored before the reverse current produced in the second diode occurs, wherein the current value of the circuit current flowing through the commutation circuit is ascertained in dependence on the current profile before the reverse current occurs. Preferably, a plateau current value occurring before the reverse current occurs or before the commutation of the current from the second diode onto the first semiconductor switch is ascertained as the current value of the circuit current. This results in the advantage that the temperature of the barrier layer of the second diode is determinable directly in dependence on the ascertained difference. As an alternative, a current value during the commutation of the current from the second diode onto the first semiconductor switch is ascertained as the current value of the circuit current.

According to a preferred embodiment, provision is made for the current profile after the reverse current produced in the second diode occurs to be monitored, wherein, in dependence on the current profile, a plateau current value occurring after the occurrence of the reverse current is ascertained, wherein a maximum absolute value of the reverse current is ascertained in dependence on the difference, for one part, and on the plateau current value, for the other, and wherein the temperature of the barrier layer of the second diode is determined in dependence on the maximum absolute value of the reverse current. With such a procedure, the accuracy of the determination of the temperature of the second diode is increased. Preferably, the plateau current value is subtracted from the difference to ascertain the maximum absolute value of the reverse current.

Preferably, the temperature of the barrier layer of the second diode is determined in dependence on an intermediate circuit voltage that is present at the power electronics unit. The intermediate circuit voltage is the electrical voltage that is provided by a current or voltage source connected to the power electronics unit. It is assumed that the intermediate circuit voltage that is present at the power electronics unit also influences the extreme current value. By taking into account the intermediate circuit voltage, accuracy during the determination of the temperature of the barrier layer of the second diode is thus increased.

According to a preferred embodiment, provision is made for the temperature of the barrier layer of the second diode to be determined in dependence on a time duration for switching the first semiconductor switch to be conducting. The time duration for switching the first semiconductor switch to be conducting is understood to mean the time duration that the first semiconductor switch requires to transition from a non-conducting, or blocking, state into a conducting state. It is assumed that the time duration for switching the first semiconductor switch to be conducting influences the extreme current value in a manner such that a reduction in the time duration, that is to say faster switching of the first semiconductor switch to be conducting, brings about an increase in the extreme current value occurring as a maximum or a decrease in the extreme current value occurring as a minimum.

Preferably, the temperature of the barrier layer of the second diode is determined with the aid of a characteristic diagram and/or a lookup table. Both the characteristic diagram and the lookup table are suitable measures for taking into account the dependence of the extreme current value on the intermediate circuit voltage and/or on the current value of the load current during the determination of the temperature of the barrier layer of the second diode.

According to a preferred embodiment, provision is made for the current profile and/or for the voltage profile to be measured either on a side of the second diode facing away from the first semiconductor switch device or on a side of the first semiconductor switch device facing away from the second diode. The extreme current value of the reverse current produced in the second diode is capturable on both of those sides. Consequently, both sides are suitable for measuring the current profile and the voltage profile. If the current profile is measured on the side of the second diode facing away from the first semiconductor switch device, the extreme current value generally appears as a minimum. If the current profile is measured on the side of the first semiconductor switch device facing away from the second diode, the reverse current appears as an overcurrent that corresponds to the reverse current, with the result that the extreme current value then appears as a maximum.

For the formation of the power electronics unit as a half bridge, the power electronics unit preferably has a second semiconductor switch device, which has a second semiconductor switch, and the second diode, wherein, after the second semiconductor switch has been switched to be conducting, the current profile during an electrical reverse current produced in the first diode is monitored, and wherein a temperature of a barrier layer of the first diode is determined in dependence on the current profile during the reverse current produced in the first diode. As described above, the extreme current value of the second diode is capturable both on the side of the first semiconductor switch device facing away from the second diode and also on the side of the second diode facing away from the first semiconductor switch device. The result of this is that an extreme current value during the occurrence of the reverse current produced in the first diode is likewise capturable on both of those sides. Half bridges are generally controlled such that the load current flowing through the load has a sinusoidal profile. To this end, the half bridges or the semiconductor switches of the half bridges are preferably controlled in a pulse-width-modulated manner. In this case, in a time period in which the load current has a positive current value, for example the first semiconductor switch and the second diode are active, with the result that these two elements or one of these two elements conduct(s) current. In this time period, the temperature of the barrier layer of the second diode is then determinable using the method. In a time period in which the load current has a negative current value, the second semiconductor switch and the first diode are then active, with the result that the temperature of the barrier layer of the first diode is determinable by the method in this time period. Preferably, the current profile during the occurrence of the reverse current produced in the second diode and the current profile during the occurrence of the reverse current produced in the first diode are monitored on the same side or by means of the same measuring device. This results in the advantage that both the temperature of the barrier layer of the first diode and also the temperature of the barrier layer of the second diode are determinable by means of the same measuring device. In particular, the power electronics unit is embodied in the form of a half bridge, without the temperature of the barrier layer of the first diode being determined after the second semiconductor switch has been switched to be conducting.

According to a preferred embodiment, provision is made for the monitoring of the current profile to be started in dependence on a time point at which the second semiconductor switch is being switched off. The time point at which the second semiconductor switch is being switched off, that is to say is being switched to be non-conducting, is specified by a controller of the commutation circuit or of the power electronics unit. The time point at which the second semiconductor switch is being switched off is consequently already known and is therefore advantageously suitable as a trigger or starting signal for the monitoring of the current profile.

Advantageously, an integral of the reverse current is ascertained, wherein the temperature of the barrier layer of the second diode is determined in dependence on the integral. In this way, the susceptibility of the method to faults is reduced. The integral of the profile of the reverse current here corresponds to a reverse recovery load Q, of the second diode. The reverse recovery load is also a temperature-dependent electrical semiconductor property. Preferably, the integral of the profile of the reverse current is determined during the entire time duration of the occurrence of the reverse current. Alternatively, preferably only one time section of the time duration is taken into account when determining the integral.

The apparatus according to the invention for determining a temperature of a power electronics unit, which has at least one commutation circuit and a load that is/can be powered by the commutation circuit, wherein the commutation circuit comprises a first semiconductor switch device, which has a first semiconductor switch and optionally a first diode, and a second diode, wherein the second diode and the load are connected to the first semiconductor switch in parallel with one another, in that the apparatus, as a controller, is specifically configured for performing the method according to the invention with proper use. The already mentioned advantages are also evident therefrom. Further preferred features and combinations of features are evident from the description above and from the claims.

The power electronics unit according to the invention, which has at least one commutation circuit and a load that is/can be powered by the commutation circuit, wherein the commutation circuit comprises a first semiconductor switch device, which has a first semiconductor switch and optionally a first diode, and a second diode, wherein the second diode and the load are connected to the first semiconductor switch in parallel with one another, by the apparatus according to the invention. The already mentioned advantages are also evident therefrom. The power electronics unit preferably has a second semiconductor switch device for the formation of the commutation circuit as a half bridge, wherein the second semiconductor switch device comprises a second semiconductor switch and the second diode. In particular, the first semiconductor switch and/or the second semiconductor switch are embodied as IGBTs. The first diode and/or the second diode are in that case preferably diodes that are formed separately from the semiconductor switches and are switched antiparallel to the semiconductor switches. The first semiconductor switch and/or the second semiconductor switch are preferably embodied as MOSFETs. The first diode and/or the second diode are in that case preferably body diodes of the semiconductor switches in the form of MOSFETs. Alternatively, the first and/or second diode are preferably diodes that are formed separately from the semiconductor switches that are embodied as MOSFETs and are switched antiparallel to the semiconductor switches. In this case, the first semiconductor switch and/or the second semiconductor switch are preferably embodied in the form of silicon-based MOSFETs.

BRIEF DESCRIPTION OF THE DRAWINGS

The invention will be described in more detail below with reference to the drawings, in which identical and corresponding elements in the figures are denoted with this same reference signs. In the figures.

DETAILED DESCRIPTION

Figure 1:
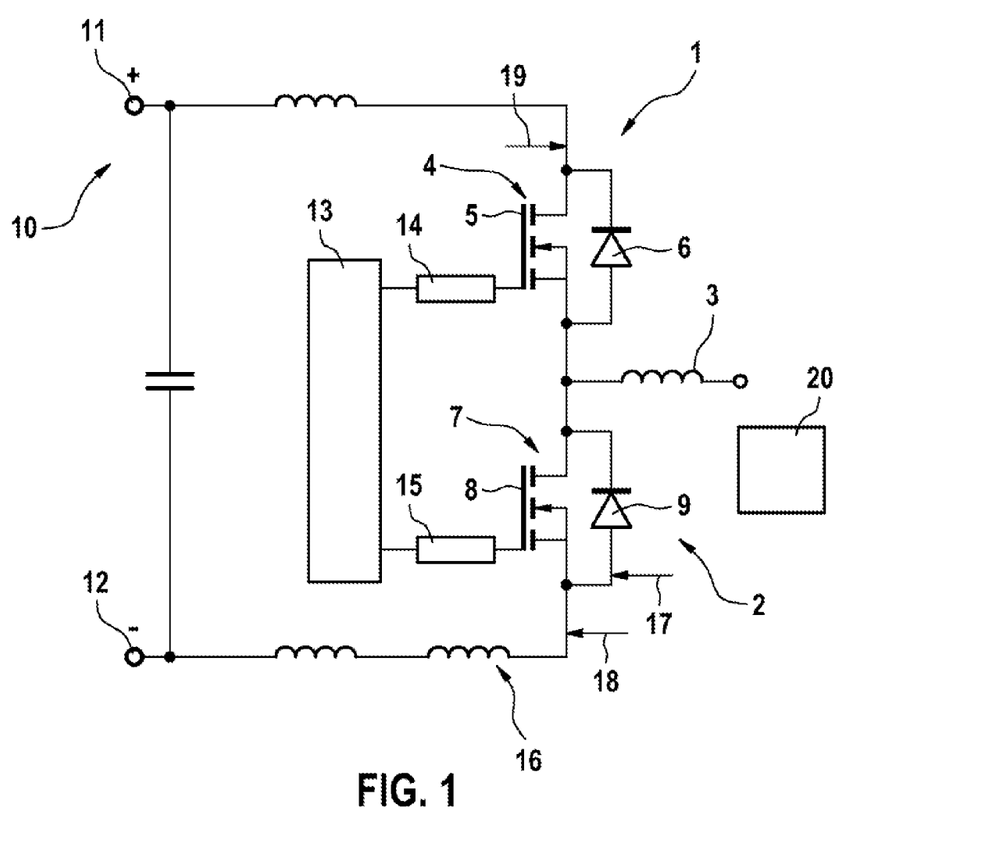
FIG. 1 shows a circuit diagram of a power electronics unit.

FIG. 1 shows a circuit diagram of a power electronics unit 1. The power electronics unit 1 has a commutation circuit 2 and a load 3. In the present case, the commutation circuit 2 is embodied in the form of a half bridge 2. To this end, the commutation circuit 2 has a first semiconductor switch device 4 with a first semiconductor switch 5 and a first diode 6. In addition, the commutation circuit 2 has a second semiconductor switch device 7 with a second semiconductor switch 8 and a second diode 9. However, it is not necessary for forming the commutation circuit 2 that the first semiconductor switch 5, the second semiconductor switch 8, the first diode 6, and the second diode 9 are present. According to a further exemplary embodiment of the commutation circuit 2, the first semiconductor switch 5 and optionally the second diode 9 are dispensed with. The commutation circuit 2 in that case is formed as a single-quadrant drive and has the second semiconductor switch 8, the first diode 6, and optionally the second diode 9. According to yet a further exemplary embodiment of the commutation circuit 2, the second semiconductor switch 8 and optionally the first diode 6 are dispensed with. The commutation circuit 2 is embodied in the form of a single-quadrant drive in that case, too, and has the first semiconductor switch 5, the second diode 9, and optionally the first diode 6.

The second diode 9 and the load 3 are connected to the first semiconductor switch 5 in parallel with one another. The first diode 6 and the load 3 are connected to the second semiconductor switch 8 in parallel with one another. The power electronics unit 1 additionally has a voltage source 10, which comprises a plus pole 11 and a minus pole 12. In the present case, the plus pole 11 is connected to the first semiconductor switch device 4. The minus pole 12 is connected to the second semiconductor switch device 7.

The power electronics unit 1 additionally has a control circuit 13. The latter is embodied to control the first semiconductor switch 5 and the second semiconductor switch 8. To this end, the control circuit 13 is connected to a gate of the first semiconductor switch 5 by means of a first resistor 14 and to a gate of the second semiconductor switch 8 by means of a second resistor 15. The control circuit 13 is embodied to control the semiconductor switches 5 and 8 in a pulse-width-modulated manner such that an electrical load current flowing through the load 3 has a sinusoidal profile. In this case, an electrical current flows, for one part, through the load 3 and, for the other, through the first semiconductor switch 5 and/or the second diode 9 if the sinusoidal load current has a positive current value. If the sinusoidal load current has a negative current value, an electrical current flows, for one part, through the load 3 and, for the other, through the second semiconductor switch 8 and/or the first diode 6.

The commutation circuit 2 or the power electronics unit 1 furthermore has a parasitic inductance 16 located on a side of the second diode 9 facing away from the first semiconductor switch device 4.

Figure 2:
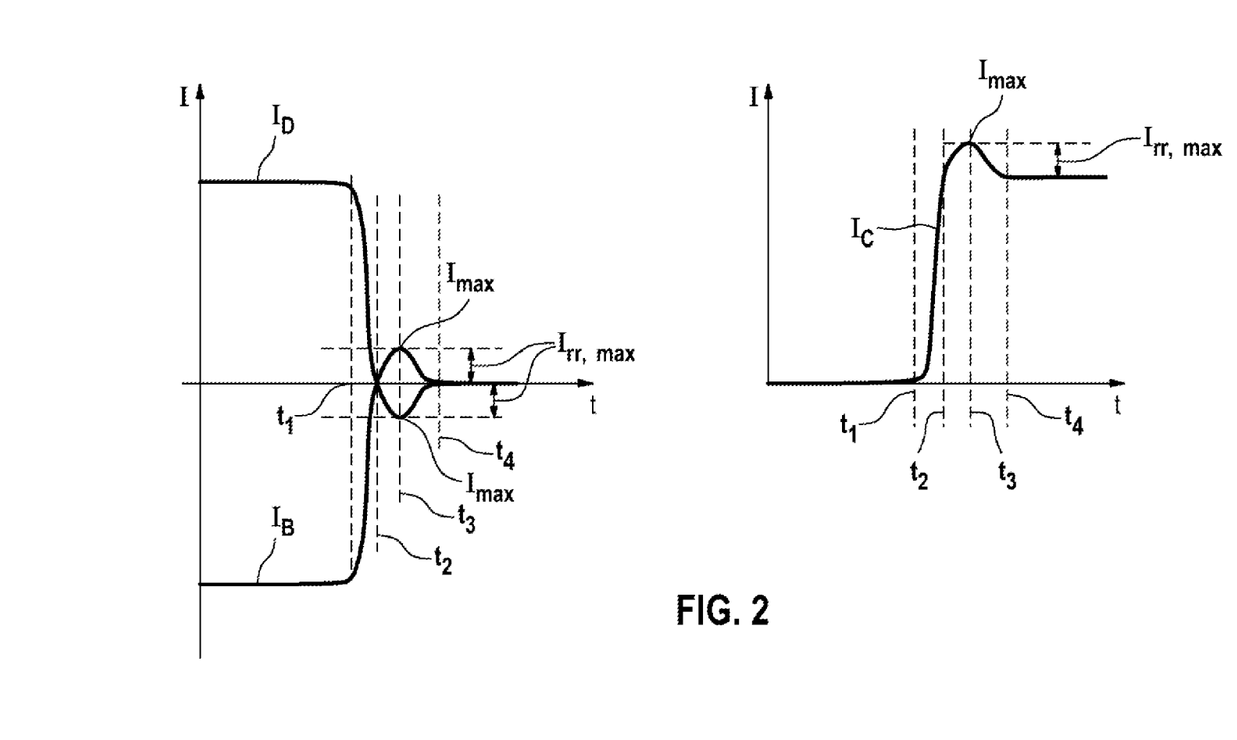
FIG. 2 shows two diagrams, in which current profiles through a commutation circuit of the power electronics unit are illustrated.

With reference to FIG. 2, different current profiles of a circuit current flowing through the commutation circuit 2 will be explained below. The first diagram shown on the left in FIG. 2 shows a current profile $I_D$. the current profile $I_D$ describes an electrical current flowing through the second diode 9 in the forward direction. It is assumed here that the sinusoidal load current has a positive current value. An electrical current thus flows through the load 3, for one part, and through the first semiconductor switch 5 and/or the second diode 9, for the other. For example, the current profile $I_D$ is measurable at the point marked by the arrow 17 in FIG. 1. Before a first time point $t_1$, the first semiconductor switch 5 is non-conducting. A current value of the electrical current flowing through the second diode 9 before the first time point $t_1$ substantially corresponds to the current value of the load current flowing through the load 3. Starting with the time point $t_1$, the first semiconductor switch 5 is at least partially conducting. From this time point, the electrical current flowing through the second diode 9 commutates onto the first semiconductor switch 5. That means that the current value of the electrical current flowing through the second diode 9 decreases between the time point $t_1$ and a second time point $t_2$. At the same time, a current value of an electrical current flowing through the first semiconductor switch 5 increases. At the second time point $t_2$, the current value of the current flowing through the second diode 9 is zero. After the time point $t_2$, remaining charge carriers present in a space charge zone of the second diode 9 are removed from the space charge zone. As a result, an electrical reverse current, that is to say a current flowing through the second diode 9 counter to the forward direction of the second diode 9, is produced in the second diode 9 between the time point $t_2$ and a time point $t_4$. At a time point $t_3$, the reverse current has an extreme current value in this case a minimum. This extreme current value $I_{max}$, or a magnitude of the extreme current value $I_{max}$, is dependent on a temperature of a barrier layer of the second diode 9. It is thus a temperature-dependent electrical semiconductor property. After the time point $t_4$, the reverse current ends. The current value of the current flowing through the second diode 9 is then substantially 0. The difference between the extreme current value $I_{max}$ and a plateau current value occurring after the time point $t_4$ is the maximum absolute value $I_{rr,max}$ of the reverse current. The current profile $I_B$ likewise represents the current profile through the second diode 9. However, the current profile $I_B$ is inverted compared to the current profile $I_D$, meaning that the extreme current value $I_{max}$ in this case appears as a maximum. The current profile $I_D$ and the current profile $I_B$ are also measurable at the point marked by the arrow 18 in FIG. 1.

The second diagram shown on the right in FIG. 2 shows a current profile $I_C$. The latter represents the current that is measurable at the point marked by the arrow 19 in FIG. 1. It is thus the current that flows through the first semiconductor switch 5 in the forward direction. The time points $t_1$, $t_2$, $t_3$ and $t_4$ in each case correspond to the time points illustrated in the first diagram. Before the time point $t_1$, the first semiconductor switch 5 is not conducting, which means that a current value of the current profile $I_C$ is 0. As is evident from the second diagram, the reverse current flowing through the second diode 9 counter to the forward direction between the time points $t_2$ and $t_4$ manifests in the current profile $I_C$ as an overcurrent, wherein a maximum absolute value $I_{rr,max}$ of the overcurrent corresponds to the maximum absolute value $I_{rr,max}$ of the reverse current. After the time point $t_4$, the current value of the current profile $I_C$ substantially corresponds to the current value of the load current flowing through the load 3.

Figure 3:
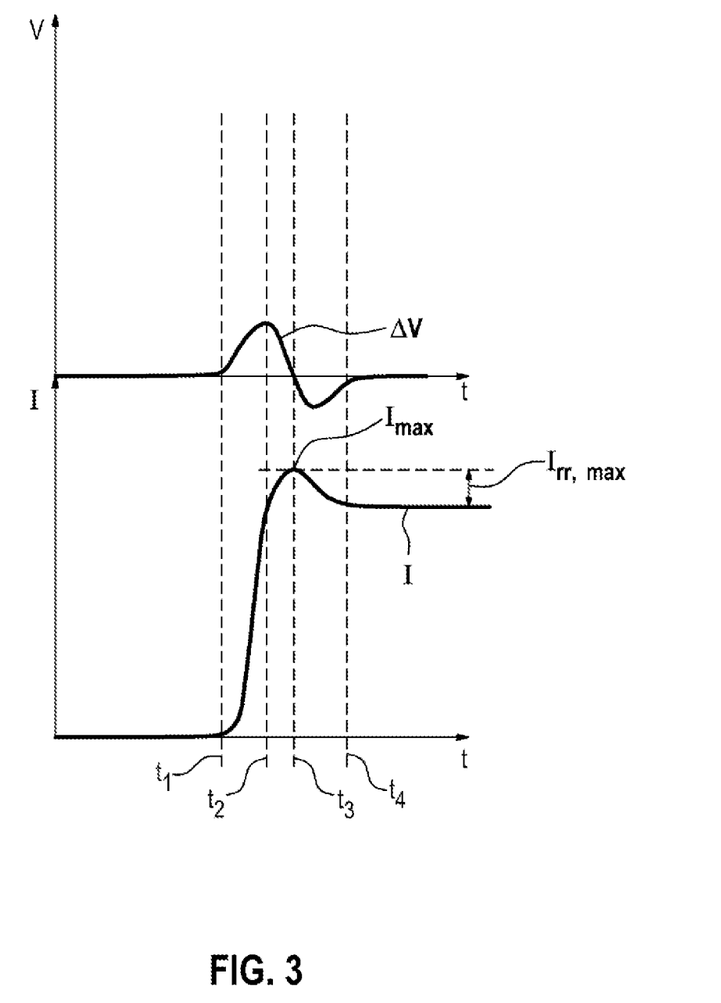
FIG. 3 shows a diagram, in which a voltage profile of a parasitic inductance and a current profile ascertained in dependence on the voltage profile are illustrated.

FIG. 3 shows a voltage profile $\Delta V$ of an electrical voltage that is present at the parasitic inductance 16. The time points $t_1$, $t_2$, $t_3$ and $t_4$ here also correspond to the time points illustrated in the first diagram of FIG. 2. The voltage that is present at the parasitic inductance 16 has a positive voltage value between the time points $t_1$ and $t_3$. The voltage that is present at the parasitic inductance 16 has a negative voltage value between the time points $t_3$ and $t_4$. After the time point $t_4$, the voltage value is substantially 0. A current profile I that corresponds to the current profiles $I_B$, $I_D$ and $I_C$ is ascertainable in dependence on the voltage profile $\Delta V$. To this end, the voltage profile ΔV is integrated. The ascertained current profile I then corresponds to the measurable current profile $I_C$.

Figure 4:
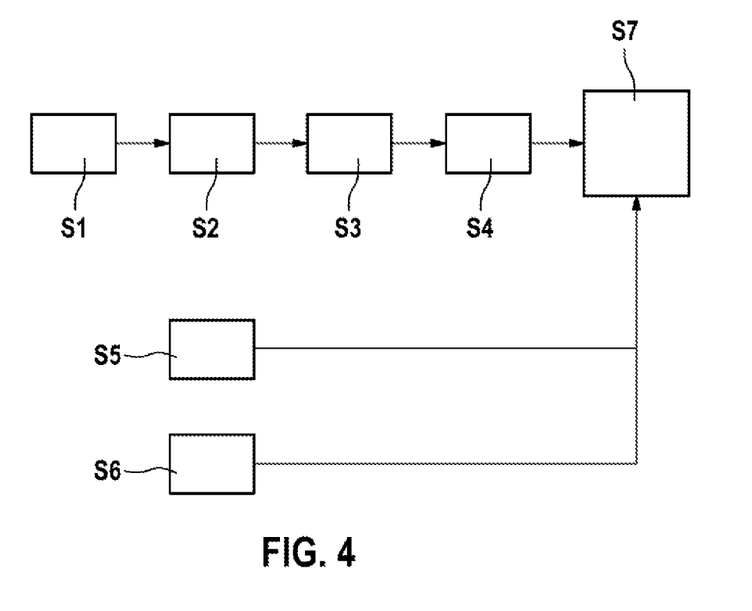
FIG. 4 shows a method for determining a temperature of a diode of the power electronics unit according to a first exemplary embodiment.

With reference to FIG. 4, a first exemplary embodiment of a method for determining the temperature of the barrier layer of the second diode 9 will be explained below. The method is performed at a time point at which the load current having the sinusoidal profile through the load 3 has a positive current value. If the load current through the load 3 has a negative current value, the method for determining the temperature of the barrier layer of the first diode 6 can be performed analogously thereto.

In a step S1, the monitoring of the current profile through the second diode 9 is started in dependence on the capturing of a trigger or starting signal. In the present case, switching off the second semiconductor switch 8, that is to say switching it to be non-conducting, is captured as the trigger. For monitoring the current profile, the current at one of the points marked by the arrows 17, 18 or 19 or the voltage that is present at the parasitic inductance 16 is optionally measured in a step S2. Alternatively to the voltage of the parasitic inductance 16, a voltage of a parasitic inductance that is present on a side of the first semiconductor switch device 4 facing away from the second semiconductor switch device 7 is measured. If the voltage is measured in step S2, a current profile is ascertained in a step S3 in dependence on the voltage profile of the voltage. To this end, the voltage profile is integrated. Reference is then made to step S4. If a current is measured in step S2, reference is made directly to step S4.

In this step S4, a difference between an extreme current value $I_{max}$, which occurs between the time points $t_2$ and $t_4$, that is to say during the occurrence of the reverse current, and a current value of a circuit current flowing through the commutation circuit 2 is ascertained in dependence on the current profile. The current value of the circuit current is preferably a current value ascertained in dependence on the current profile. Preferably, a current value of the current profile before the time point $t_2$, that is to say before the reverse current occurs, with particular preference before the time point $t_1$, that is to say at a time point at which the first semiconductor switch 5 is non-conducting, is selected as the current value of the circuit current. An intermediate circuit voltage, that is to say a voltage that is present between the plus pole 11 and the minus pole 12, is ascertained or provided in a step S5. In a step S6, a current value of a load current flowing through the load 3 is ascertained or provided. Preferably, the load current flowing through the load 3 is ascertained in dependence on the current profile. Alternatively, the load current is ascertained by a separate current measurement device assigned to the load 3. In a step S7, the temperature of the barrier layer of the second diode 9 is ascertained in dependence on the ascertained difference, the intermediate circuit voltage, and the load current flowing through the load 3.

Figure 5:
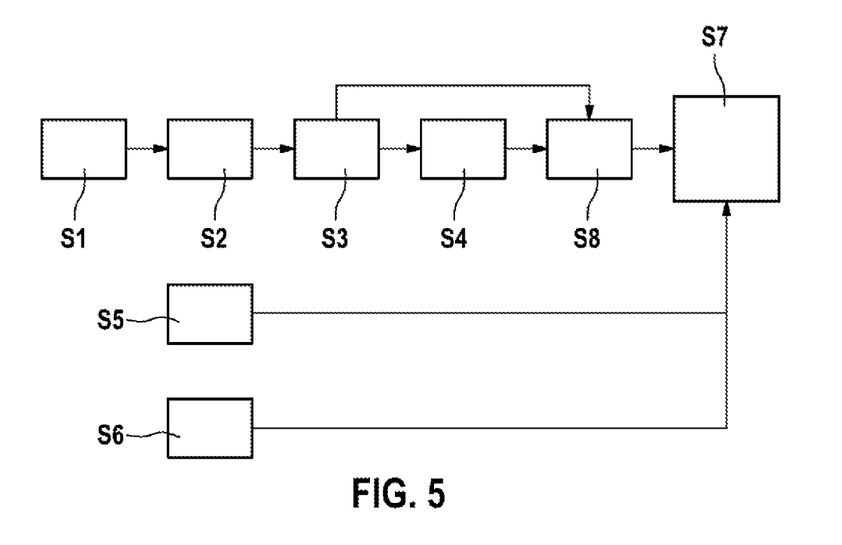
FIG. 5 shows a method for determining the temperature of the diode according to a second exemplary embodiment.

FIG. 5 shows a further exemplary embodiment of the method for determining the temperature of the barrier layer of the second diode 9. The exemplary embodiment illustrated in FIG. 5 differs from the exemplary embodiment illustrated in FIG. 4 in particular in that a plateau current value occurring after the reverse current, that is to say after the time point $t_4$, is ascertained in dependence on the current profile. In a step S8, a maximum absolute value $I_{rr,max}$ of the reverse current is then ascertained in dependence, for one part, on the difference and, for the other, on the plateau current value. In step S7, the temperature of the barrier layer of the second diode 9 is then determined in dependence on the maximum absolute value $I_{rr,max}$ of the reverse current, on the intermediate circuit voltage, and on the current value of the load current. The second exemplary embodiment illustrated in FIG. 5 offers increased accuracy compared to the exemplary embodiment illustrated in FIG. 4.

With reference to FIG. 1, the power electronics unit 1 has an apparatus 20. The apparatus 20, which is illustrated merely schematically, is embodied to perform the method for determining the temperature of the barrier layer of the second diode 9. To this end, the apparatus 20 is communicatively connected to measurement devices that supply to the apparatus 20 the current value of the load current flowing through the load 3, the intermediate circuit voltage, and the measured voltage values or the measured current values.

The invention claimed is:

1. A method for determining a temperature of a power electronics unit (1), which has at least one commutation circuit (2) and a load (3) configured to be powered by the commutation circuit (2), wherein the commutation circuit (2) comprises a first semiconductor switch device (4), which has a first semiconductor switch (5) and a second diode (9), the method comprising:
    connecting the second diode (9) and the load (3) to the first semiconductor switch (5) in parallel with one another,
    after the first semiconductor switch (5) has been switched to be conducting, monitoring a current profile of an electrical current flowing through the second diode (9) while an electrical reverse current is produced in the second diode (9),
    ascertaining a difference between a current value of a circuit current flowing through the commutation circuit (2) and an extreme current value ($I_{max}$) produced by the reverse current, and
    determining a temperature of the barrier layer of the second diode (9) in dependence on the current profile and the difference.

2. The method as claimed in claim 1, wherein the temperature of the barrier layer of the second diode (9) is ascertained in dependence on a correction value that corresponds to a current value of a load current flowing through the load (3).

3. The method as claimed in claim 1, wherein the current flowing through the second diode (9) is measured for the purpose of monitoring the current profile.

4. The method as claimed in claim 1, wherein a voltage profile of a parasitic inductance (16) of the commutation circuit (2) is captured, and the current profile is ascertained in dependence on the captured voltage profile.

5. The method as claim 1, wherein the current profile is monitored before the reverse current produced in the second diode (9) occurs, wherein the current value of the circuit current flowing through the commutation circuit (2) is ascertained in dependence on the current profile before the reverse current occurs.

6. The method as claimed in claim 1, wherein the current profile is monitored after the reverse current produced in the second diode (9) occurs, wherein a plateau current value occurring after the reverse current occurs is ascertained, wherein a maximum absolute value ($I_{rr,max}$) of the reverse current is ascertained in dependence on the difference and on the plateau current value, and wherein the temperature of the barrier layer of the second diode (9) is determined in dependence on the maximum absolute value ($I_{rr,max}$) of the reverse current.

7. The method as claimed in claim 1, wherein the temperature of the barrier layer of the second diode (9) is determined in dependence on an intermediate circuit voltage that is present at the power electronics unit (1).

8. The method as claimed in claim 1, wherein the temperature of the barrier layer of the second diode (9) is determined in dependence on a time duration for switching the first semiconductor switch (5) to be conducting.

9. The method as claimed in claim 1, wherein the temperature of the barrier layer of the second diode (9) is determined with the aid of a characteristic diagram.

10. The method as claimed in claim 1, wherein the current profile, a voltage profile, or both are measured either on a side of the second diode (9) facing away from the first semiconductor switch device (4) or on a side of the first semiconductor switch device (4) facing away from the second diode (9).

11. The method as claimed in claim 1, wherein, for the formation of the power electronics unit (1) as a half bridge (2), the power electronics unit (1) has a second semiconductor switch device (7), which has a second semiconductor switch (8) and the second diode (9), wherein, after the second semiconductor switch (8) has been switched to be conducting, the current profile during an electrical reverse current produced in a first diode (6) is monitored, and wherein a temperature of a barrier layer of the first diode (6) is determined in dependence on the current profile during the reverse current produced in the first diode (6).

12. The method as claimed in claim 1, wherein the monitoring of the current profile is started in dependence on a time point at which the second semiconductor switch (8) is being switched off.

13. The method as claimed in claim 1, wherein an integral of the reverse current is ascertained, and the temperature of the barrier layer of the second diode (9) is determined in dependence on the integral.

14. An apparatus (20) for determining a temperature of a power electronics unit (1), wherein the power electronics unit (1) has at least one commutation circuit (2) and a load (3) configured to be powered by the commutation circuit (2), wherein the commutation circuit (2) comprises a first semiconductor switch device (4), which has a first semiconductor switch (5) and a first diode (6), and a second diode (9), wherein the second diode (9) and the load (3) are connected to the first semiconductor switch (5) in parallel with one another, wherein the apparatus (20) is configured to connect the second diode (9) and the load (3) to the first semiconductor switch (5) in parallel with one another, after the first semiconductor switch (5) has been switched to be conducting, monitor a current profile of an electrical current flowing through the second diode (9) while an electrical reverse current is produced in the second diode (9), ascertain a difference between a current value of a circuit current flowing through the commutation circuit (2) and an extreme current value ($I_{max}$) produced by the reverse current, and determine a temperature of the barrier layer of the second diode (9) in dependence on the current profile and the difference.

\* \* \* \* \*